United States Patent
Kaupert et al.

(10) Patent No.: US 10,173,164 B2
(45) Date of Patent: Jan. 8, 2019

(54) DEVICE FOR THE DETACHABLE FASTENING OF A DRYING AGENT CARTRIDGE TO A HOUSING OF A COMPRESSED-AIR TREATMENT INSTALLATION OF A VEHICLE

(71) Applicant: MAN Truck & Bus AG, München (DE)

(72) Inventors: Oliver Kaupert, München (DE); Wolfgang Kolland, München (DE); Georg Haslberger, Reichertsheim (DE); Thomas Hofstetter, Mainburg (DE)

(73) Assignee: MAN Truck & Bus AG, Munich (DE)

( * ) Notice: Subject to any disclaimer, the term of this patent is extended or adjusted under 35 U.S.C. 154(b) by 24 days.

(21) Appl. No.: 15/294,163

(22) Filed: Oct. 14, 2016

(65) Prior Publication Data

US 2017/0106325 A1  Apr. 20, 2017

(30) Foreign Application Priority Data

Oct. 16, 2015  (DE) ........................ 10 2015 013 493

(51) Int. Cl.
| | |
|---|---|
| *B01D 53/02* | (2006.01) |
| *B01D 53/04* | (2006.01) |
| *B60T 17/00* | (2006.01) |
| *F16M 13/02* | (2006.01) |
| *B01D 53/26* | (2006.01) |

(52) U.S. Cl.
CPC ..... *B01D 53/0407* (2013.01); *B01D 53/0415* (2013.01); *B60T 17/004* (2013.01); *F16M 13/02* (2013.01); *B01D 53/261* (2013.01); *B01D 2257/80* (2013.01); *B01D 2258/06* (2013.01); *B01D 2259/4566* (2013.01)

(58) Field of Classification Search
CPC ............ B01D 2257/80; B01D 2258/06; B01D 2259/4566; B01D 53/0407; B01D 53/0415; B01D 53/261; B60T 17/004; F16M 13/02
See application file for complete search history.

(56) References Cited

U.S. PATENT DOCUMENTS

| 7,972,418 B2 | 7/2011 | Hilberer |
|---|---|---|
| 8,021,465 B2 | 9/2011 | Hilberer |

(Continued)

FOREIGN PATENT DOCUMENTS

| DE | 19721230 | * 11/1998 |
|---|---|---|
| DE | 102006037311 A1 | 2/2008 |

(Continued)

OTHER PUBLICATIONS

Extended European Search Report issued in corresponding application No. 16001980.8 dated Mar. 28, 2017.

*Primary Examiner* — Christopher P Jones
(74) *Attorney, Agent, or Firm* — Weber Rosselli & Cannon LLP

(57) ABSTRACT

A device is provided for the detachable fastening of a drying agent cartridge to a housing of a compressed-air treatment installation of a vehicle, in particular of a utility vehicle. The device includes at least one fastening plate, having a first section, which is crimped to an end region of a crimped plate of a cartridge base and to an end region of a cartridge cover to form a connecting seam, and a second section, which projects outward from the connecting seam.

15 Claims, 6 Drawing Sheets

(56) References Cited

U.S. PATENT DOCUMENTS

| | | | |
|---|---|---|---|
| 2008/0110340 A1* | 5/2008 | Hoffman | B01D 53/0415 95/118 |
| 2009/0199522 A1 | 8/2009 | Hilberer | |
| 2009/0199523 A1 | 8/2009 | Hilberer | |
| 2010/0236653 A1* | 9/2010 | Hilberer | B60T 17/004 137/870 |
| 2011/0308393 A1 | 12/2011 | Minato et al. | |
| 2012/0118157 A1* | 5/2012 | Eidenschink | B01D 53/261 96/118 |
| 2012/0137887 A1* | 6/2012 | Minato | B01D 53/0415 96/118 |
| 2013/0239815 A1 | 9/2013 | Niemeyer et al. | |
| 2014/0260995 A1* | 9/2014 | Adams | B01D 46/0039 96/400 |
| 2015/0258492 A1 | 9/2015 | Nishihara et al. | |

FOREIGN PATENT DOCUMENTS

| | | |
|---|---|---|
| DE | 102007034435 A1 | 1/2009 |
| DE | 102012105137 A1 | 12/2013 |
| DE | 102013103066 A1 | 10/2014 |
| EP | 2465597 A2 | 6/2012 |
| JP | S6191321 U | 6/1986 |
| JP | S63118926 U | 8/1988 |
| JP | S63118927 U | 8/1988 |
| JP | H03-115028 U | 11/1991 |
| TW | 200510194 A | 3/2005 |
| WO | 2013/057088 A1 | 4/2013 |

\* cited by examiner

DEVICE FOR THE DETACHABLE FASTENING OF A DRYING AGENT CARTRIDGE TO A HOUSING OF A COMPRESSED-AIR TREATMENT INSTALLATION OF A VEHICLE

TECHNICAL FIELD

The present disclosure relates to a device for the detachable fastening of a drying agent cartridge to a housing of a compressed-air treatment installation of a vehicle, in particular of a utility vehicle.

BACKGROUND

Compressed-air systems, in particular in utility vehicles, require a so-called air treatment installation downstream of the air compressor. In such treatment installations, the air is, inter alia, dried and filtered, and oil constituents are separated out. These processes all take place in a so-called drying agent cartridge which, broadly speaking, is composed of a base panel with openings for the throughflow of the air and of a cup-shaped or pot-shaped cover, which base panel and cover are fixedly connected to one another. In the drying agent cartridge there is situated a moisture-adsorbing granulate which extracts the moisture from the air flowing through. When used in a utility vehicle, the granulate has only a limited service life. A reason for this is that the oil mist contained in the compressed air is deposited on the granulate and thus reduces the effective surface area for the absorption of moisture. Furthermore, the granulate can mechanically break down as a result of the vibration loading. The drying agent cartridge must therefore be exchanged at regular intervals.

For this purpose, the cartridge is typically equipped with a female thread in the base panel. It is thus possible for the used cartridge to be unscrewed from, and for a new cartridge to be screwed onto, an external thread on the housing of the compressed-air treatment installation, for example on the air dryer housing. Use is normally made of a square-section sealing ring which is compressed axially as a result of the screwing-on process, thus imparts a sealing action, and at the same time ensures the axial bracing action of the screw connection. Drying agent cartridges of the type are known for example from the laid-open specifications DE 10 2013 103 066 A1, DE 10 2012 105 137 A1 and DE 10 2007 034 435 A1.

Depending on the installation location of the compressed-air treatment installation, the accessibility to the cartridge for an exchange is often restricted. The cartridge is always fastened to the top of the housing of the compressed-air treatment installation, and therefore the optimum direction of access for the exchange of the cartridge would be from above. This freedom however does not always exist owing to body structures in the case of heavy goods vehicles or generally in the case of buses. Furthermore, work is often performed from below if the vehicle is standing over the workshop pit.

Nowadays, in some cases very firmly seated cartridges exist, in the case of which the predefined service times for the cartridge exchange in the workshop cannot be adhered to. A very high release moment is required, which, despite auxiliary means such as for example a clamping strap with a long lever, is difficult to apply because the lateral free space for the use of a lever does not exist.

In the case of the fastenings between cartridge base panel and housing of the compressed-air treatment unit such as are known from practice, because the sealing element, typically a square-section sealing ring, must co-rotate during the screwing-on process, large fluctuations arise in the tightening moment owing to different friction influences, and damage to or twisting of the sealing element occurs, which in turn results in leakage. Furthermore, the axial bracing action of the screw connection must be generated by way of the seal.

SUMMARY

It is therefore an object of the present disclosure to provide an improved means for being able to detachably fasten a drying agent cartridge to a housing of an air treatment installation, by which means the disadvantages of conventional techniques can be avoided. In particular, it is the object of the present disclosure to provide a fastening interface for a drying agent cartridge, by way of which fastening interface the cartridge can be fastened to a housing of the air treatment installation, for example of the air dryer, and can be safely and reliably released again with constant expenditure of force.

The objects are achieved by way of a device having the features of the independent claim. Advantageous embodiments and uses of the present disclosure will emerge from the dependent claims and will be discussed in more detail in the following description, with partial reference to the figures.

According to general aspects of the present disclosure, a device for the detachable fastening of a drying agent cartridge to a housing of a compressed-air treatment installation or air drying installation of a vehicle is provided. The device provides an interface for the detachable fastening of the drying agent cartridge to the housing. The housing may for example be a housing of the air dryer. The compressed-air treatment installation may be provided for a compressed-air brake installation of a vehicle. The vehicle may be a utility vehicle.

The drying agent cartridge, also referred to as drying cartridge, comprises, in a manner known per se, a cartridge housing in which there is held a drying agent container. The cartridge housing has a cover, which delimits the cartridge housing in an upward direction and which is typically of cup-shaped or pot-shaped form, and a carrier element which delimits the cartridge housing in a downward direction. In the installed position, the carrier element is detachably fastened to the housing section of the compressed-air treatment installation and will hereinafter also be referred to as cartridge base. The cartridge base comprises a crimped plate (also referred to as crimped panel) for the fastening of the cartridge base to the cartridge cover by way of a crimped formation. The encircling region on the cartridge base, at which the cartridge base is crimped to the cartridge cover, forms the so-called cartridge seam, hereinafter also referred to as connecting seam.

According to the present disclosure, a fastening device is proposed which makes do without the conventional central screw connection, in the case of which the cartridge housing is screwed onto an external thread, which extends axially centrally through the drying agent cartridge, of the housing section.

Instead, the present disclosure provides that at least one third plate, hereinafter also referred to as fastening plate or plate lug, is introduced into the crimped formation between cartridge housing cover and base plate. The fastening plate is a plate piece which has a first section, which is crimped to an end region of a crimped plate of a cartridge base and to an end region of a cartridge cover to form the cartridge seam, and a second section, which projects outward from the connecting seam and which is therefore not jointly crimped into the cartridge seam. The outwardly projecting part preferably projects radially outward.

The radial direction lies in the plane of the base panel of the drying agent cartridge, that is to say the possible radial directions are spanned by the plane of the base panel of the drying agent cartridge. The radial direction is furthermore perpendicular to the axial direction, wherein the axial direction corresponds to the direction of the central axis, which is perpendicular to the cartridge base, of the drying agent cartridge.

The outwardly projecting part of the fastening plate can be utilized for the fastening of the drying agent cartridge to the housing of the compressed-air treatment installation, for example by virtue of the part being screwed onto the housing of the compressed-air treatment installation or by virtue of a plug-type connection being formed for the axial securing of the drying agent cartridge.

Owing to the omission of the central screw connection, the following operational advantages are obtained: Owing to the absence of a thread, no chips are formed during the mounting of the cartridge. The damage to the sealing element that is otherwise possible as a result of the screw connection is avoided, such that the occurrence of leakages and malfunctions in the compressed-air and in particular brake system owing to foreign particles introduced during a cartridge exchange can be avoided. Furthermore, greater ease of maintenance during a cartridge exchange can be realized. A reason for this is that a sealing element arranged between cartridge base and housing of the compressed-air treatment installation, for example a square-section sealing ring, does not have to co-rotate during the installation of the cartridge, such that fluctuations in the tightening moment owing to different friction influences, and damage to or twisting of the sealing element, can be avoided. Furthermore, the lubrication of the sealing element can thus likewise be omitted. In this way, chemical damage to the seal owing to the use of incorrect lubricants can be avoided. A further advantage is that, owing to the omission of the central thread, the base panel no longer needs to be of such massive design, and thus a weight saving of approximately 0.5 kg can be achieved in the case of the cartridge. Furthermore, the cartridge can be mounted in freely rotatable fashion on the housing. It can thus also be ensured in future that a labelling, for example a brand logo, and/or operating instructions on the cartridge are always oriented in the same direction, for example toward the outside of the vehicle, where they are clearly visible. This cannot be ensured with the previous, screwed-on cartridge.

The incorporation of an additional plate lug into the cartridge seam is furthermore straight-forward in terms of production, and can be realized with little additional use of material.

In an embodiment, the second section of the fastening plate has at least one passage hole through which a pin-like fastening element, in particular a screw or a bolt, can be or is guided for the purposes of fastening the drying agent cartridge detachably to the housing of the compressed-air treatment installation and/or for the purposes of fixing the drying agent cartridge detachably at a particular angle of rotation relative to the housing. In this way, a secure fastening to the housing can be realized. When the drying agent cartridge is in an installed position, the housing of the air treatment installation has an opening, which is aligned with the passage hole, for receiving the pin-like fastening element. If multiple passage holes are provided, multiple aligned openings are arranged in the housing correspondingly.

To increase the relative-rotation prevention action, it is advantageous for at least two passage holes to be provided on the second section. The at least one passage hole may for example be a circular hole. The at least one passage hole may also be an outwardly open elongated hole, such that the second section can be threaded in under a pin-like fastening element that has already been inserted into the corresponding opening in the housing but has not yet been tightened. A further advantage of the embodiment as an elongated hole is that the elongated hole can simultaneously serve as an insertion aid and for the subsequent fixing.

A further advantageous possibility of the implementation according to the present disclosure provides for an insertion opening, for example an insertion pocket, to be provided on the housing of the air treatment installation, into which insertion opening or insertion pocket the second section can be inserted, preferably in a radial direction. In this case, too, the outwardly projecting section of the plate lug serves, in turn, as an insertion aid during the lateral threading-in of the drying agent cartridge. In this way, the cartridge can be installed, and axially secured, by way of a plug-type connection.

A further design variant provides for a mechanical quick-action fastener, for example a suit-case-type lock or snap-action fastener, to be arranged on the second section.

A particular embodiment of the device provides for two fastening plates to be provided, which are preferably arranged diametrically oppositely on the circumference of the connecting seam. This permits particularly secure seating of the drying agent cartridge that has been installed by way of the fastening plates.

In an advantageous variant of this embodiment, the second section of a first of the two fastening plates has at least one circular hole. The second section of the second of the two fastening plates has at least one outwardly open elongated hole, which can simultaneously serve as an insertion aid. Alternatively, on the housing, there may be provided an insertion opening and/or insertion pocket into which the second section of the second of the two fastening plates can be inserted in a radial direction. In the case of this variant, the second section of the second fastening plate may have no passage holes.

With the present disclosure, it is thus possible for a drying agent cartridge to be provided which has no thread, in particular no thread arranged axially centrally on the cartridge base, for the purposes of screwing the cartridge onto the housing of the air treatment installation.

The present disclosure also relates to a drying agent cartridge having a fastening plate as disclosed in this document, and to a motor vehicle, in particular a utility vehicle, having a device as disclosed in this document.

BRIEF DESCRIPTION OF THE DRAWINGS

The above-described embodiments and features of the present disclosure may be combined with one another in any desired manner. Further details and advantages of the present disclosure will be described below with reference to the appended drawings. In the drawings.

Identical elements are denoted by the same reference designations in all of the figures.

DETAILED DESCRIPTION

Figure 1:
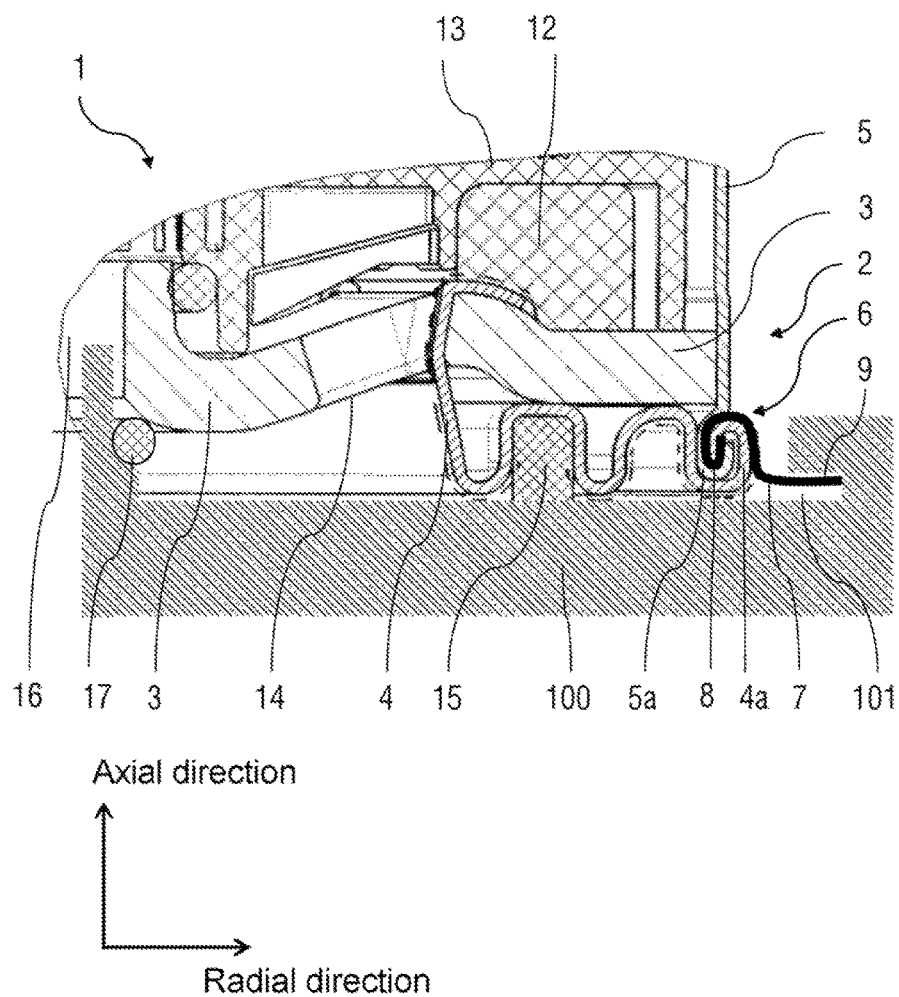
FIG. 1 shows a sectional detail view of a device according to an exemplary embodiment of the present disclosure.

Here, FIG. 1 shows a sectional detail view of a drying agent cartridge according to an exemplary embodiment of the present disclosure. FIG. 1 shows, in particular, a detail of a radially outer, lower region of a drying agent cartridge 1. The internal construction of the drying agent cartridge 1 may be of a design known per se, for example as described in the laidopen specifications DE 10 2013 103 066 A1, DE 10 2012 105 137 A1 and DE 10 2007 034 435 A1. The reference designation 13b denotes, for example, the oil filter, which is formed by a nonwoven, and the reference designation 13 denotes the internal container for the drying agent, of which only a small part is visible.

The cartridge housing of the drying agent cartridge has, in a manner known per se, a pot-shaped or cup-shaped cover 5, which delimits the cartridge housing in an upward direction, and a cartridge base 2, which delimits the cartridge housing in a downward direction. The vertical arrow in FIG. 1 indicates the axial direction of the drying agent cartridge, and the horizontal arrow denotes the radial direction of the drying agent cartridge.

As is likewise described in the laid-open specifications DE 10 2013 103 066 A1, DE 10 2012 105 137 A1 and DE 10 2007 034 435 A1, the cartridge base is formed from a carrier panel 3 and a crimped plate 4, wherein the fastening between carrier panel 3 and the pot-shaped outer cover 5 of the drying agent cartridge is realized by way of the crimped plate 4 by virtue of the outer cover 5 and the crimped plate 4 being crimped together, thereby forming the encircling connecting seam or cartridge seam 6. The carrier element has a central outflow opening 16, via which the dried and purified air exits the drying agent cartridge. FIG. 1 also shows the air inflow opening 14 in the carrier panel 3. Furthermore, a sealing ring 15 is arranged in a seal groove, which sealing ring serves for sealing off the cartridge housing with respect to the housing of the air treatment installation in the installed state. The seal groove is formed by a crimped formation of the crimped plate 4. The sealing ring may also be arranged in a seal groove of the housing of the compressed-air treatment installation. A further sealing element 17 surrounds the outflow opening 16 on the cartridge base 3 in order to form a seal between the unfiltered air at the outside and the purified air from the interior of the drying agent cartridge.

The special feature of this design variant lies firstly in the fact that at least one further areal plate piece 7 (fastening plate) is introduced into the crimped formation between cartridge housing cover 5 and base plate. Merely to highlight the plate piece 7, the latter is illustrated by the continuous black line, and not with the hatching of the sectional illustration. The plate piece 7 is crimped, by way of a first section 8, to the end region 4a of the crimped plate 4 and to the end region 5a of the cartridge housing cover 5 to form the cartridge seam 6. A second section 9 of the plate piece projects radially outward from the cartridge seam 6 and is thus not jointly crimped into the cartridge seam 6.

The outwardly projecting second section 9 may perform various functions. In the exemplary embodiment shown in FIG. 1, it is for example the case that, on the housing 100 of the air dryer, there is provided a corresponding insertion opening 101 into which the outwardly projecting second section 9 can be inserted radially, that is to say in a radial direction, whereby the second section secures the drying agent cartridge 1 in an axial direction by way of a form fit.

Figure 2A:
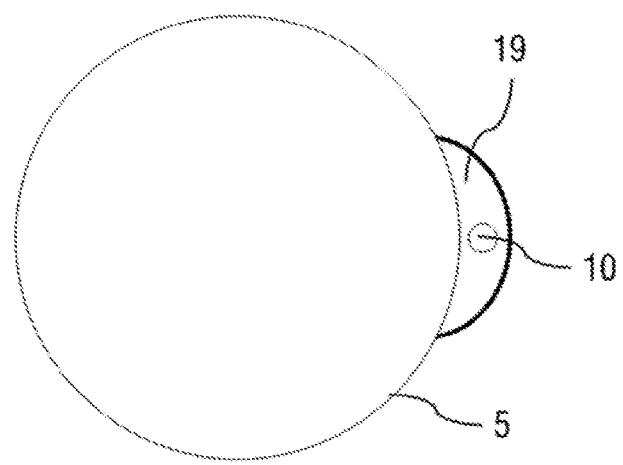
FIGS. 2A and 2B each show a plan view of a drying agent cartridge having a crimped-in plate lug according to further exemplary embodiments of the present disclosure.

FIG. 2A shows a plan view of a drying agent cartridge having a crimped-in plate lug according to a further exemplary embodiment of the present disclosure. Of the crimped-in plate lug, only that section 19 which projects outward in the radial direction is shown. The above-described first section, which is crimped into the cartridge seam, is not visible in the plan view. The outwardly projecting section 19 is of sickle-shaped form and has a central passage hole 10. In the variant shown in FIG. 2B, two passage holes 10 are formed in the outwardly projecting section 19 of the plate lug.

Figure 3A:
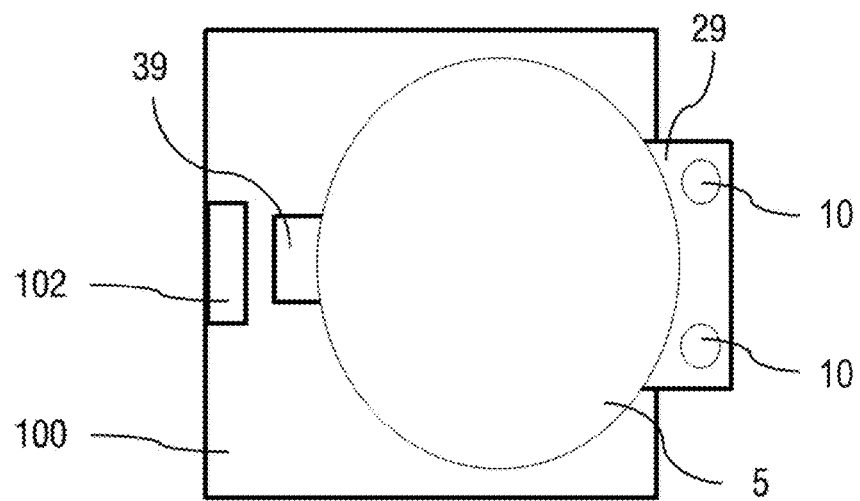
FIGS. 3A to 3D show a process of installation of the drying agent cartridge by way of a device according to a further exemplary embodiment of the present disclosure.

Into the passage holes 10 there may be guided a pin-like fastening element, for example a screw or a bolt, for the purposes of fastening the drying agent cartridge detachably to the housing of the compressed-air treatment installation. This is shown for example in FIGS. 3A to 3D. FIG. 3A shows, in turn, a plan view of a drying agent cartridge according to an exemplary embodiment of the present disclosure. It is now the case that two plate lugs have been incorporated into the cartridge seam circumferentially on opposite sides, of which plate lugs again only in each case the outwardly projecting second sections 29 and 39 are shown.

Figure 2B:
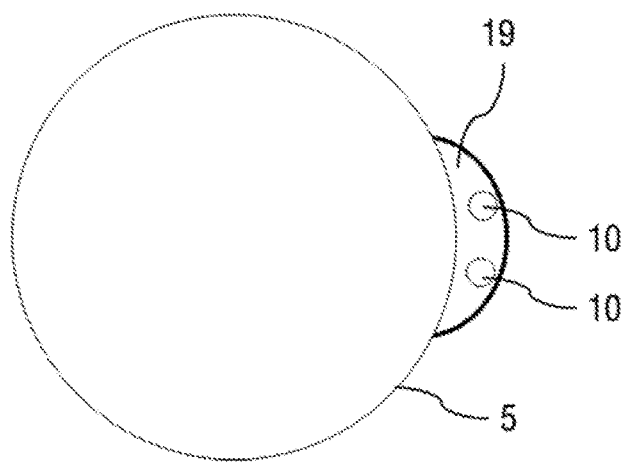

The second section 29 of the plate piece incorporated on the right-hand side again has two passage holes 10, but differs from the second section 19 shown in FIG. 2B merely in terms of the shape, which is now rectangular.

Figure 3B:
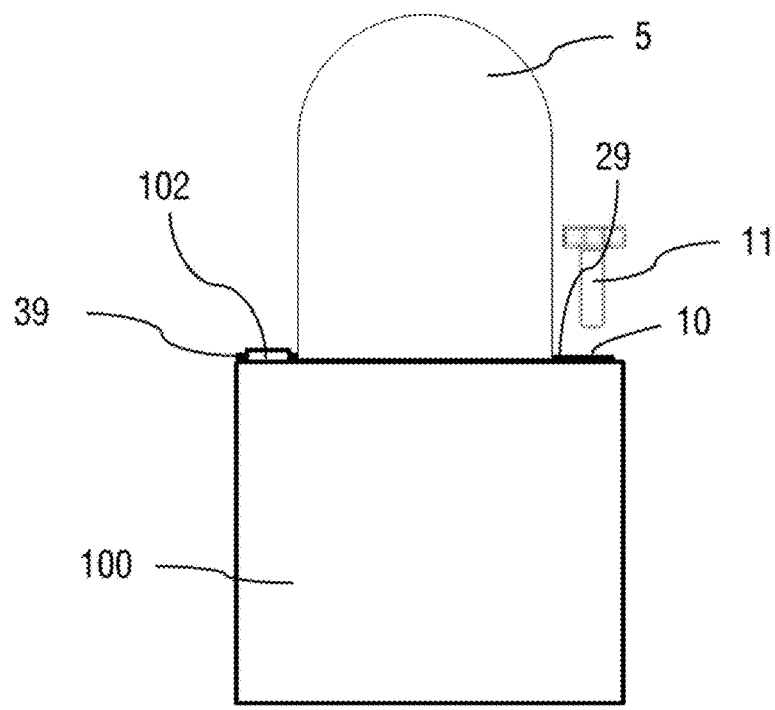
Figure 3C:
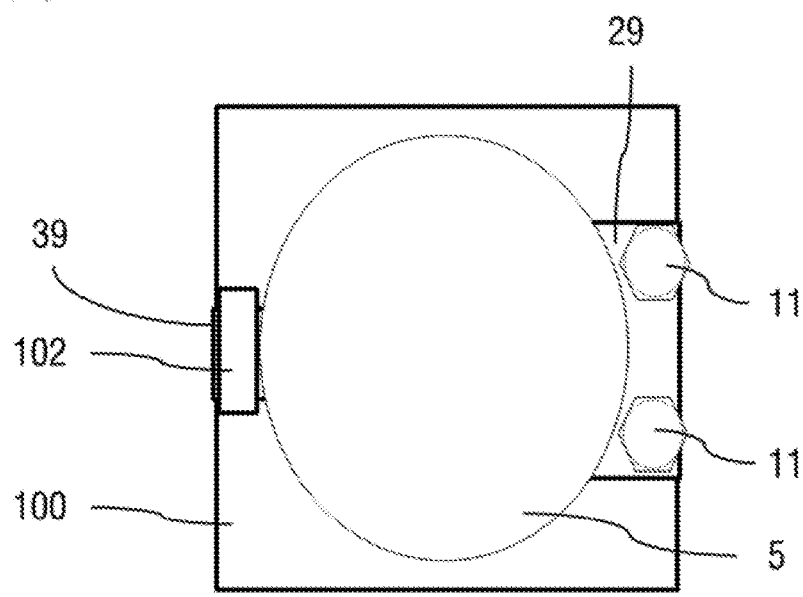
Figure 3D:
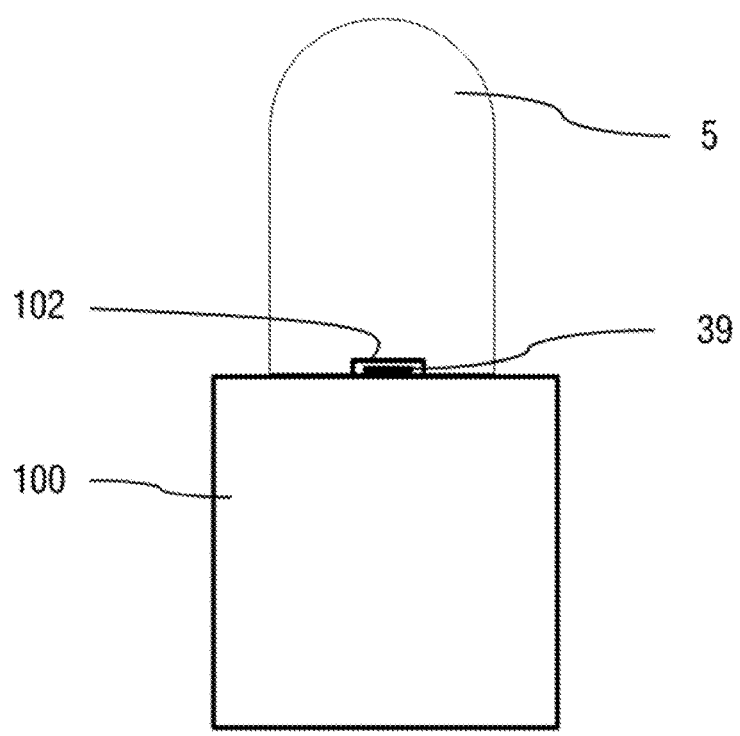

The second section 39 of the plate piece that is incorporated on the left-hand side is designed to be narrower, and has no passage holes. On the top side of the housing 100 of the compressed-air treatment installation, a corresponding insertion opening, into which the second section 39 can be inserted in a radial direction, is formed by way of an insertion pocket, in particular a bracket 102. FIGS. 3B and 3C and 3D show a front view and a plan view and a side view, respectively, in a state in which the right-hand second section 39 has been inserted into the insertion opening of the bracket 102.

In this state, it is then possible for the drying agent cartridge to be additionally secured by way of a screw connection of the left-hand plate lug. For this purpose, in each case one screw 11 is inserted into the passage holes 10. When the drying agent cartridge is in an installed position, the housing 100 of the compressed-air treatment installation has an opening (not shown), which is aligned with each passage hole 10, for receiving the screw 11. FIG. 3B illustrates the insertion of the screw 11. FIG. 3C shows the drying agent cartridge in the screwed-on state of the second section 29 of the plate lug.

Figure 4A:
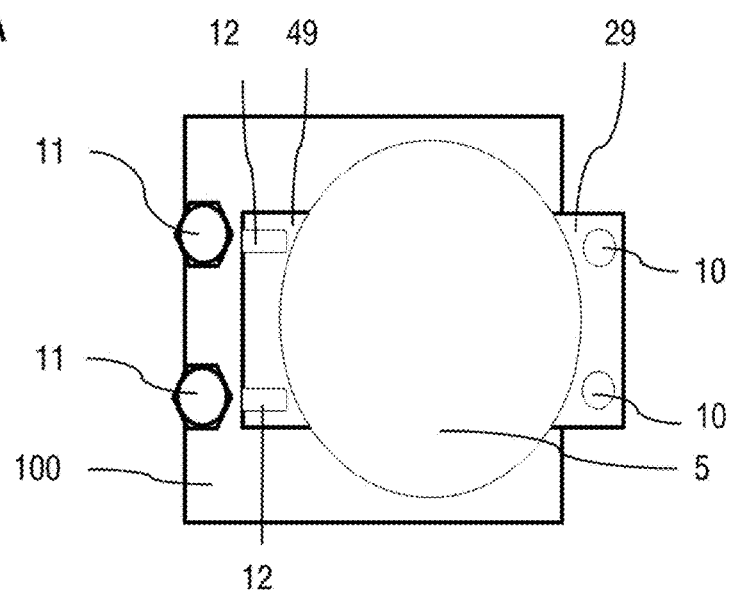
FIGS. 4A to 4D show a process of installation of the drying agent cartridge by way of a device according to a further exemplary embodiment of the present disclosure.
Figure 4B:
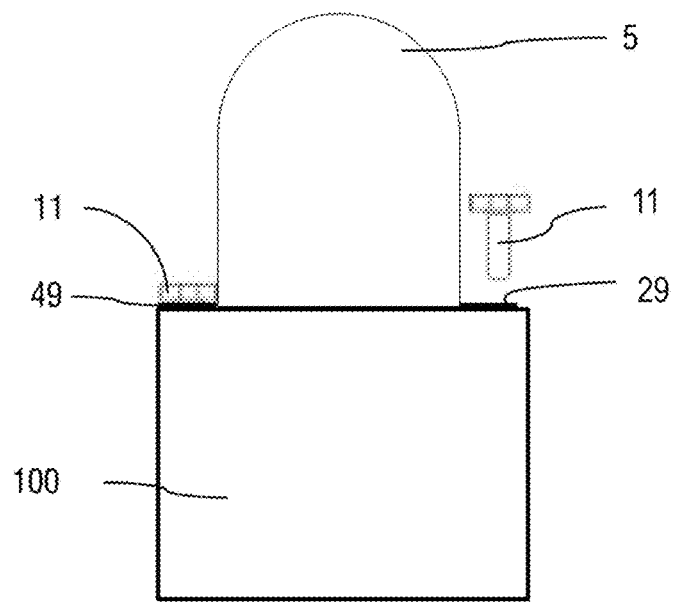
Figure 4C:
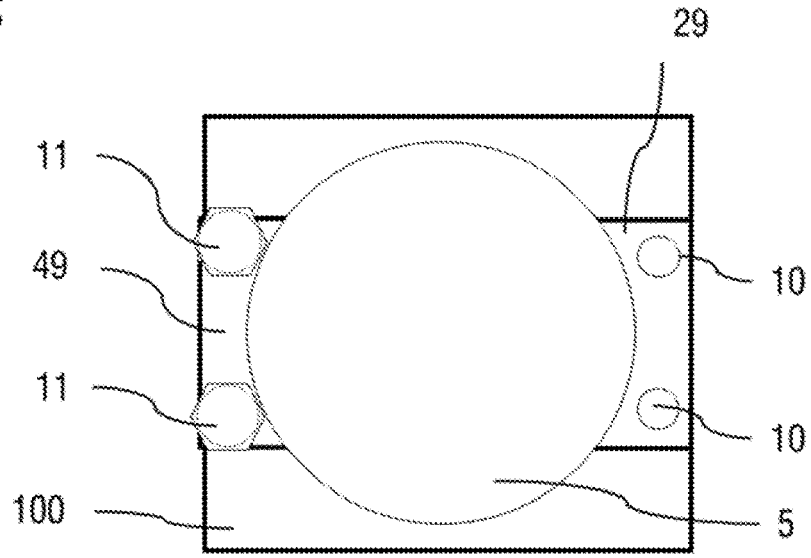
Figure 4D:
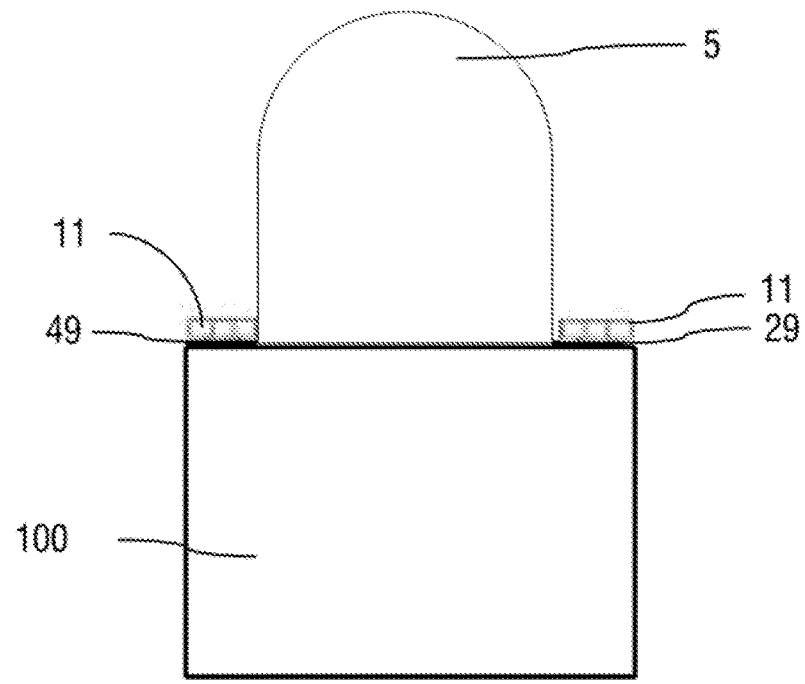

FIGS. 4A and 4D illustrate the installation of the drying agent cartridge in accordance with a further exemplary embodiment. In this variant, it is again the case that, on opposite sides of the drying agent cartridge, in each case one plate piece has additionally been crimped into the connecting seam, with in each case one radially outwardly projecting second section 29, 49. The second section 29 corresponds to the second section shown in FIGS. 3A to 3D, and has two circular holes 10. By contrast, the second section 49 of the other plate piece has two outwardly open elongated holes 12. The elongated holes 12 simultaneously serve as insertion aids for the purposes of the second section 49 being threaded in under a pin-like fastening element 11, for example a screw 11, which has already been inserted into the corresponding opening in the housing but has not yet been tightened. FIG. 4A and FIG. 4C illustrate this again in a plan view. FIG. 4B shows a front view in the state in which the second section 29 of the plate lug has not yet been screwed on. FIG. 4D shows the screwed-on state.

Even though the present disclosure has been described with reference to particular exemplary embodiments, it is evident to a person skilled in the art that various changes may be made, and equivalents used as replacements, without departing from the scope of the present disclosure. Furthermore, numerous modifications may be made without departing from the associated scope. Consequently, the present disclosure is not intended to be restricted to the disclosed exemplary embodiments, but is rather intended to encompass all exemplary embodiments which fall within the scope of the appended patent claims. In particular, the present disclosure also claims protection for the subject matter and the features of the sub-claims independently of the claims referred to.

The invention claimed is:

1. A device for the detachable fastening of a drying agent cartridge to a housing of a compressed-air treatment installation of a vehicle, comprising:
    at least one fastening plate having a first end section, which is crimped to an end region of a crimped plate of a cartridge base and to an end region of a cartridge cover to form a connecting seam, and a second end section, which projects outward from the connecting seam;
    wherein the first end section is introduced into the connecting seam between the cartridge cover and the cartridge base.

2. The device according to claim 1, wherein the second end section of the fastening plate has at least one passage hole through which a pin-like fastening element is guided for the purposes of fastening the drying agent cartridge detachably to the housing of the compressed-air treatment installation.

3. The device according to claim 2, wherein two passage holes are provided on the second end section.

4. The device according to claim 2, wherein two passage holes are provided on the second end section and the at least one passage hole is in the form of a circular hole.

5. The device according to claim 2, wherein two passage holes are provided on the second end section and the at least one passage hole is in the form of an outwardly open elongated hole, such that the second end section can be threaded in under a pin-like fastening element.

6. The device according to claim 2, wherein the at least one passage hole is in the form of a circular hole.

7. The device according to claim 2, wherein the at least one passage hole is in the form of an outwardly open elongated hole, such that the second end section can be threaded in under a pin-like fastening element.

8. The device according to claim 1, wherein on the housing of the compressed-air treatment installation, there is provided an insertion opening and/or insertion pocket into which the second end section can be inserted.

9. The device according to claim 1, wherein a mechanical quick-action fastener is arranged on the second end section.

10. The device according to claim 1, wherein two fastening plates are provided, which are preferably arranged diametrically oppositely on the circumference of the connecting seam.

11. The device according to claim 10, wherein the second end section of a first of the two fastening plates has at least one circular hole, and the second end section of the second of the two fastening plates has at least one outwardly open elongated hole.

12. The device according to claim 10, wherein the second end section of a first of the two fastening plates has at least one circular hole, and on the housing, there is provided an insertion opening and/or insertion pocket into which the second end section of the second of the two fastening plates can be inserted in a radial direction.

13. The device according to claim 1, wherein the drying agent cartridge has no thread arranged axially centrally on the cartridge base for the purposes of screwing the cartridge onto the housing of the air treatment installation.

14. A motor vehicle comprising:
    a housing of a compressed-air treatment installation of the vehicle; and
    a device configured to detachably fasten a drying agent cartridge to the housing of the compressed-air treatment installation of the vehicle, the device comprising:
    at least one fastening plate having a first end section, which is crimped to an end region of a crimped plate of a cartridge base and to an end region of a cartridge cover to form a connecting seam, and a second end section, which projects outward from the connecting seam;
    wherein the first end section is introduced into the connecting seam between the cartridge cover and the cartridge base.

15. The device according to claim 1, wherein the second end section of the fastening plate has at least one passage hole through which a pin-like fastening element is guided for the purposes of fixing the drying agent cartridge detachably at a particular angle of rotation relative to the housing.

* * * * *